United States Patent [19]  [11] 4,091,170
Godfrey  [45] May 23, 1978

[54] COATING COMPOSITION FOR ORGANIC POLYMERIC FILMS

[75] Inventor: John N. Godfrey, Asheville, N.C.

[73] Assignee: Olin Corporation, Pisgah Forest, N.C.

[21] Appl. No.: 847,407

[22] Filed: Oct. 31, 1977

[51] Int. Cl.$^2$ .................... B32B 27/06; B32B 23/08
[52] U.S. Cl. .................... 428/510; 260/23 XA
[58] Field of Search .................... 260/23 XA; 428/510

[56] References Cited

U.S. PATENT DOCUMENTS

| | | | |
|---|---|---|---|
| 2,877,922 | 3/1959 | De Cristoforo | 260/23 XA X |
| 3,114,425 | 8/1964 | Koch et al. | 428/510 |
| 3,306,755 | 2/1967 | Sincock et al. | 99/171 |
| 3,375,215 | 3/1968 | Kane | 260/23 XA |
| 3,394,024 | 7/1968 | Owens | 428/510 |
| 3,419,421 | 12/1968 | Eastes | 427/384 |
| 3,442,836 | 5/1969 | Barry | 260/23 XA |
| 3,447,948 | 6/1969 | Koch | 428/503 |
| 3,696,082 | 10/1972 | Smith | 428/510 |
| 3,701,745 | 10/1972 | Settlage et al. | 260/28.5 R |
| 3,765,911 | 10/1973 | Knowles et al. | 106/2 |
| 3,817,780 | 6/1974 | Hinkamp et al. | 428/510 |
| 3,856,534 | 12/1974 | Fletcher | 106/13 |

*Primary Examiner*—Lewis T. Jacobs
*Attorney, Agent, or Firm*—Robert W. Habel

[57] ABSTRACT

A heat-sealable coating composition for organic polymeric films such as regenerated cellulose film that provides good runnability properties of the coated films on automatic packaging machines, comprising a conventional heat-sealable vinylidene chloride copolymer coating composition containing from about 0.4 to 1.5% by weight of an alkali metal salt of lauryl sulfate and from about 0.2 to 1.0% by weight of an alkaline earth metal stearate, alkali metal stearate, or ammonium stearate. In addition, the composition may also contain from 0.4 to 1.0% lecithin. The coating composition provides good packaging machine runnability properties in a single coating on organic polymeric films without impairing heat-sealability, and its appearance in response to high relative humidity exposure can be varied in degrees of antifogging characteristics by adjustment of the sulfate and stearate additive concentrations.

13 Claims, No Drawings

COATING COMPOSITION FOR ORGANIC POLYMERIC FILMS

BACKGROUND OF THE INVENTION

1. Field of the Invention

This invention relates generally to polymer coated organic polymeric films, and more particularly to a heat-sealable vinylidene chloride copolymer coating composition for organic polymeric films with good automatic packaging machine runnability properties.

2. Description of the Prior Art

Organic polymeric films such as cellophane are typically coated on one or both surfaces with a vinylidene chloride copolymer (saran) coating composition to provide the film with better moisture barrier properties. Such coated films are heat-sealable and are used to make packages on automatic packaging machinery which requires that the film must have good machine runnability properties, possess adequate slip, be free of blocking tendencies, and be readily heat-sealable so that packages can be properly formed, particularly on automatic packaging machinery of the type employing crimped sealing bars. In addition to the runnability performance, when the film is used for wrapping foodstuffs of relatively high moisture content, it is necessary that the film possess antifogging properties so that moisture from the packaged product does not deposit upon the internal surface of the film package in minute droplets as a fog. This tendency of moisture deposit in the form of a fog on the interior surface of the package reduces transparency and greatly interferes with the effective display of the particular packaged article.

In order to provide a heat-sealable vinylidene chloride copolymer coated film with good machine runnability properties that is nonfogging, the conventional practice in the industry is to apply a second coating containing a wetting agent on top of the vinylidene chloride copolymer coating. A conventional wetting agent used in the topcoating is sodium lauryl sulfate. This second coating step requires a second coating tower, adding to the cost of the system, and since the basic vinylidene chloride coating is normally applied using organic solvents and the topcoating is normally applied using an aqueous solution of the wetting agent, complications arise, particularly with regard to drying, solvent removal, and solvent recovery. A typical example of such a topcoating composition is disclosed in U.S. Pat. No. 3,394,024 in which the antifog and release agent composition is applied to the surface of the film after application of the base coating of saran by passing it through an aqueous solution of the composition, removing excess solution from the film by passing it through a set of squeeze rolls, and thereafter drying it. The topcoating composition in this case is an aqueous solution of a water-soluble metal salt, such as magnesium acetate or calcium acetate, in combination with sodium lauryl sulfate.

Another conventional method of improving the machine performance of vinylidene chloride copolymer coated cellophane is disclosed in U.S. Pat. No. 3,375,215, while additives are incorporated in the vinylidene chloride copolymer coating composition itself to improve the machine performance. The additives disclosed for this purpose are candelilla wax in combination with a stearate salt such as calcium or ammonium stearate. While such additives do improve the machine performance of the coated film, the wettability characteristics of the coating are, however, impaired making uniform printing of the coated cellophane difficult. Moreover, film produced in this manner fogs and requires a topcoating step to produce a nonfogging surface.

It is therefore an object of this invention to provide a vinylidene chloride copolymer coating composition for organic polymeric films which provides, in one coating, improved runnability performance of the polymer coated film on automatic packaging machinery with the flexibility of imparting full or partial nonfogging characteristics without impairing the machine performance or heat-sealability of the coated film and that does not require a second or topcoating application of a release agent.

SUMMARY OF THE INVENTION

Surprisingly, we have discovered that conventional vinylidene chloride copolymer coating compositions can be provided with good packaging machine runnability properties and be made nonfogging as desired without impairing heat-sealability and other properties when applied to organic polymeric films by incorporating two additives in the coating composition that act synergistically with one another to produce the desired properties. In accordance with the invention, a vinylidene chloride copolymer composition is provided for organic polymeric films in which the coating composition contains from about 0.4 to 1.5% by weight of an alkali metal salt of lauryl sulfate and from about 0.2 to 1.0% by weight of a stearate salt selected from the group consisting of alkaline earth metal stearates, alkali metal stearates, and ammonium stearate. Preferably, the composition contains 0.5% of the sulfate salt and 0.25 to 0.45% of the stearate salt.

The basic principle of the invention is to include as additives to a conventional saran polymer coating bath an alkali metal salt of lauryl sulfate which imparts desirable properties to the coated film if it is on the film surface and a stearate salt which uniquely forces the lauryl sulfate salt to bloom to the film surface. Both additives must be present to achieve the desired result and act synergistically with one another resulting in a heat-sealable coating for organic polymeric films such as regenerated cellulose film which has good release and other machinability characteristics when used on automatic packaging machines and can be made nonfogging or fogging as desired.

The preferred alkali metal salt of lauryl sulfate is sodium lauryl sulfate and the preferred stearate salt is calcium stearate.

While it is well known that sodium lauryl sulfate imparts desirable release properties to a coated film surface if it is on the surface of the film as when it is applied from an aqueous solution in conventional topcoating applications, simply using it as an additive in vinylidene chloride copolymer compositions does not achieve any desirable benefits because the sodium lauryl sulfate will not be present on the surface of the film. Surprisingly, the stearate salt acts synergistically with the alkali lauryl sulfate when used in combination to uniquely force the alkali lauryl sulfate to the coated surface of the film. Also, it has been discovered that if additional release properties from the crimp jaws in the automatic packaging machine at a very high temperature are desired, small amounts of lecithin may be used as a third additive in the coating composition with very desirable results. Preferably, the amount of lecithin used is from about 0.4 to 1.0% by weight based on the weight of the coating.

The unique combination of additives in accordance with this invention can be used in any conventional vinylidene chloride copolymer coating formulation. Conventional additives may be incorporated in the coating composition to provide film slip and antiblocking characteristics, to adjust the bath viscosity, and to improve roll formation in the coated film without being detrimentally affected by the alkali lauryl sulfate/stearate salt combination or addition of lecithin. The amount of alkali metal salt of lauryl sulfate employed should be at least 0.4% and no greater than 1.5% since amounts less than 0.4% are insufficient to produce the desired release properties in the coated film surface or any antifogging characteristics, and amounts greater than 1.5% tend to be detrimental to other properties in the coated film such as heat-sealability. Also, at least 0.2% of the stearate salt is required to achieve the desired synergistic effect with the alkali metal lauryl sulfate to cause it to bloom to the surface of the coated film and amounts greater than 1.0% of the stearate salt tend to detrimentally affect transparency and heat-sealability of the coating. The coating composition is generally amenable with any organic polymeric film and is particularly suitable for use with transparent regenerated cellulose films such as cellophane. Other properties of the coated films such as heat-sealability, vapor permeability, slip, and blocking are not significantly affected by the additive combination of this invention. Conventional slip and antiblocking agents such as finely pulverized talc, mica or clay may be used in the coating composition without diminishing the release and antifogging improvements obtained from the additive combination. Thorough dispersion of the additives in the coating formulation should be obtained by rapid mixing or other means in order to take full advantage of the synergism between the two. The coating formulations containing the additives can be applied to the organic polymeric base film using doctor rolls or any other conventional applicating technique.

PREFERRED EMBODIMENTS

The following examples will serve to further illustrate the invention.

EXAMPLE I

Conventional vinylidene chloride copolymer coating baths were prepared to which were added various concentrations of sodium lauryl sulfate and calcium stearate, all concentrations in precent by weight based on the weight of the coating. The baths were then used to coat identical samples of regenerated cellulose film using a dip tank with doctor rolls and subsequent drying of the coated film with the following results:

TABLE I

| Coating Bath | % Sodium Lauryl Sulfate | % Calcium Stearate | Fogging Characteristics | Amount of Sodium Lauryl Sulfate on Film Surface |
| --- | --- | --- | --- | --- |
| 1 | 0.0 | 0.0 | Fogs | — |
| 2 | 0.0 | 0.9 | Fogs | — |
| 3 | 1.0 | 0.9 | Nonfogging | 2.6 mg/m$^2$ |
| 4 | 1.0 | 0.0 | Fogs | 0.0 |

As shown in the above table, the stearate salt is essential in making the sodium lauryl sulfate bloom to the coated film surface, as indicated by fogging characteristics and surface analysis.

EXAMPLE II

Vinylidene chloride copolymer coating baths were prepared similar to those in Example I using 1% sodium lauryl sulfate and various stearate salts incorporated in the baths. The baths were then used to coat identical samples of regenerated cellulose film with the following results:

TABLE II

| Coating Bath | % Sodium Lauryl Sulfate | % Stearate Salt | Fogging Characteristics | Jaw Release and Machinability Properties |
| --- | --- | --- | --- | --- |
| 1 | 1.0 | 0 | Fogs | Poor |
| 2 | 1.0 | 0.9 Potassium Stearate | Nonfogging | Good |
| 3 | 1.0 | 0.9 Magnesium Stearate | Nonfogging | Good |
| 4 | 1.0 | 0.9 Sodium Stearate | Nonfogging | Good |
| 5 | 1.0 | 0.9 Ammonium Stearate | Nonfogging | Good |
| 6 | 1.0 | 0.9 Calcium Stearate | Nonfogging | Good |

From the foregoing it will thus be seen that a variety of stearate salts are effective in accordance with the invention.

EXAMPLE III

Coating baths similar to those in Example I were prepared with constant percentages of calcium stearate and various concentrations of sodium lauryl sulfate and lecithin and used to coat identical samples of regenerated cellulose film with the following results:

TABLE III

| Coating Bath | % Sodium Lauryl Sulfate | % Calcium Stearate | % Lecithin | Fogging Characteristics | Jaw Release and Machinability Properties |
| --- | --- | --- | --- | --- | --- |
| 1 | 1.5 | 0.9 | 0.0 | Nonfogging | Good |
| 2 | 1.0 | 0.9 | 0.0 | Nonfogging | Good |
| 3 | 0.7 | 0.9 | 0.0 | Some fogging | Good |
| 4 | 0.5 | 0.9 | 0.0 | Some fogging | Good |
| 5 | 0.5 | 0.9 | 0.5 | Nonfogging | Good |
| 6 | 0.4 | 0.9 | 0.0 | Fogs | Fair |
| 7 | 0.2 | 0.9 | 0.0 | Fogs | Poor |
| 8 | 0.0 | 0.9 | 0.5 | Fogs | Poor |
| 9 | 0.0 | 0.9 | 1.0 | Fogs | Poor |

The foregoing table shows that the fogging characteristics of the film can be adjusted by varying the sodium lauryl sulfate concentration. Lecithin can be observed to enhance slightly the nonfogging characteristics of film coatings with sodium lauryl sulfate and calcium stearate although film coatings containing only lecithin and calcium stearate fogged. Characteristically, the nonfogging or partial fogging films possessed much better release and machinability properties while still retaining excellent heat-sealability.

EXAMPLE IV

Coating baths similar to those in the preceding examples containing sodium lauryl sulfate, lecithin, and various concentrations of calcium stearate were used to coat regenerated cellulose film with the following results:

TABLE IV

| Coating Bath | % Sodium Lauryl Sulfate | % Lecithin | % Calcium Stearate | Fogging Characteristics | Jaw Release and Machinability Properties |
|---|---|---|---|---|---|
| 1 | 0.5 | 0.5 | 0.9 | Nonfogging | Good |
| 2 | 0.5 | 0.5 | 0.5 | Nonfogging | Good |
| 3 | 0.5 | 0.5 | 0.35 | Some fogging | Excellent |
| 4 | 0.5 | 0.5 | 0.25 | Some fogging | Good |
| 5 | 0.5 | 0.5 | 0.15 | Some fogging | Good |
| 6 | 0.5 | 0.5 | 0.0 | Fogs | Poor |

As shown, the fogging characteristics of the coated film samples are adjustable by varying the calcium stearate concentration in the baths while release and machinability properties vary depending upon the amount used.

EXAMPLE V

Another series of vinylidene chloride copolymer coated samples similar to those in Examples II and IV were prepared showing that although satisfactory machine performance is obtained with either the combination of soidum lauryl sulfate-calcium stearate or sodium lauryl sulfate-calcium stearate-lecithin additive systems, the latter system was preferable for best high temperature (300° F) performance without sticking tendencies on packaging machines. However, both systems possessed Grade 1 runnability characteristics as determined by standard grading systems used in the industry.

TABLE V

| Temperature | 1.0% Sodium Lauryl Sulfate 0.9% Calcium Stearate | 0.5% Sodium Lauryl Sulfate 0.35% Calcium Stearate 0.5% Lecithin |
|---|---|---|
| 200° F | Good seal, no sticking | Good seal, no sticking |
| 225° F | Good seal, no sticking | Good seal, no sticking |
| 250° F | Good seal, no sticking | Good seal, no sticking |
| 275° F | Good seal, no sticking | Good seal, no sticking |
| 300° F | Good seal, sticking | Good seal, no sticking |

The above examples indicate the unique and surprising advantages that are obtained using the synergistic combination of additives in accordance with this invention. The combination of alkali lauryl sulfates with various stearate salts as additives in saran coating formulations produces results not heretofore obtainable in a single coating. The surprising feature of the invention derives from the fact that the alkali lauryl sulfate is effective only when it is at the film surface and that the inclusion of a stearate salt is essential to accomplish this purpose. The combination of an alkali lauryl sulfate with a stearate salt is synergistic and the result is distinctly different from that predicted by the use of either alone. The additional use of lecithin to the alkali lauryl sulfate/stearate additive combination is not essential but does further enhance and extend the practical applicability of the system. Other conventional additives used in saran polymer coatings to improve film slip and antiblocking characteristics, to adjust polymer bath viscosity, and to improve roll formation may also be employed as desired without affecting the advantages obtained from this invention.

Although the present invention has been described in conjunction with the preferred embodiments, the examples and description are only illustrative of the invention and it is to be understood that there are many variations and modifications that may be resorted to without departing from the spirit or scope of the invention, as those skilled in the art will readily understand.

What is claimed is:

1. In a vinylidene chloride copolymer coating composition for organic polymeric films, the improvement comprising incorporating in the coating composition from about 0.4 to 1.5% by weight of an alkali metal salt of lauryl sulfate and from about 0.2 to 1.0% by weight of a stearate salt selected from the group consisting of alkaline earth metal stearates, alkali metal stearates, and ammonium stearate.

2. The composition of claim 1 in which the alkali metal salt of lauryl sulfate is sodium lauryl sulfate.

3. The composition of claim 1 in which the stearate salt is calcium stearate.

4. The composition of claim 1 comprising additionally from 0.4 to 1.0% by weight lecithin.

5. The composition of claim 1 containing 0.5% of the lauryl sulfate and 0.25 to 0.45% of the stearate salt.

6. A heat-sealable organic polymeric film having a single coating of vinylidene chloride copolymer coating composition on at least one surface thereof, said coating composition containing from about 0.4 to 1.5% by weight of an alkali metal salt of lauryl sulfate and from about 0.2 to 1.0% by weight of a stearate salt selected from the group consisting of alkaline earth metal stearates, alkali metal stearates, and ammonium stearate.

7. A heat-sealable regenerated cellulose film having a single coating of a vinylidene chloride copolymer coating composition on at least one surface thereof, said coating composition containing from about 0.4 to 1.5% by weight of an alkali metal salt of lauryl sulfate and from about 0.2 to 1.0% by weight of a stearate salt selected from the group consisting of alkaline earth metal stearates, alkali metal stearates, and ammonium stearate.

8. The coated regenerated cellulose film of claim 7 in which the alkali metal salt of lauryl sulfate is sodium lauryl sulfate.

9. The coated regenerated cellulose film of claim 7 in which the stearate salt is calcium stearate.

10. The coated regenerated cellulose film of claim 7 in which the coating composition contains additionally from 0.4 to 1.0% by weight lecithin.

11. The coated regenerated cellulose film of claim 7 in which the coating composition contains 0.5% by weight of the lauryl sulfate salt.

12. The coated regenerated cellulose film of claim 7 in which the coating composition contains 0.25 to 0.45% of the stearate salt.

13. The coated regenerated cellulose film of claim 10 in which the coating composition contains 0.5% by weight lecithin.

* * * * *